Nov. 1, 1932.                R. SPEIDEL                1,886,061
APPARATUS FOR PEELING POTATOES
Filed Dec. 17, 1929
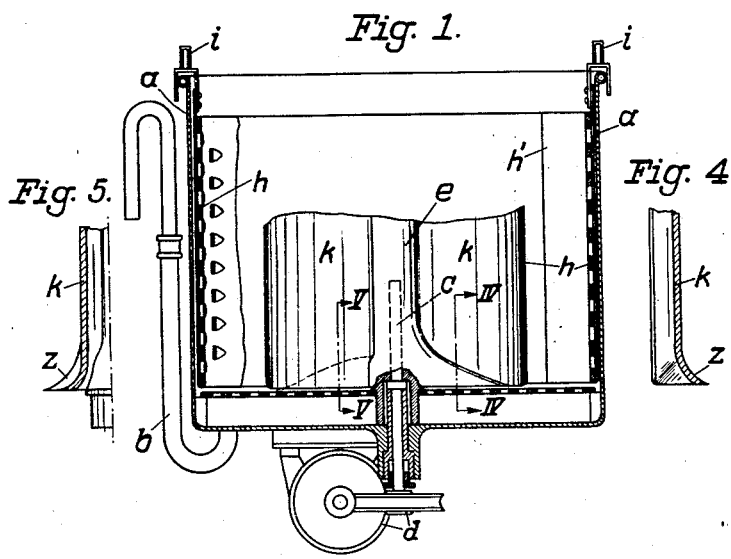
Fig. 1.
Fig. 5.      Fig. 4.
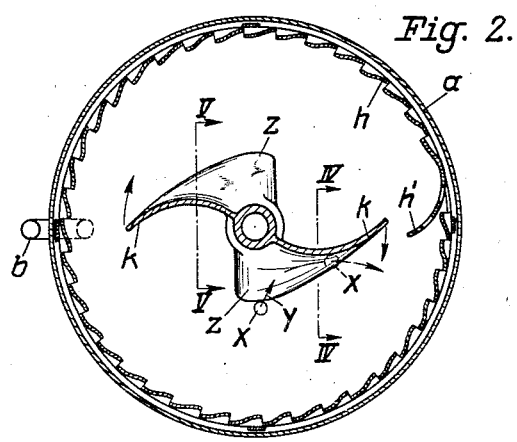
Fig. 2.
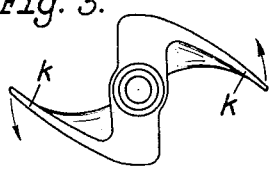
Fig. 3.
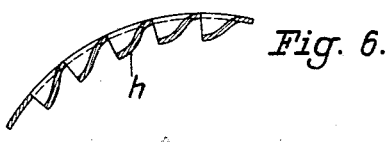
Fig. 6.
Inventor:
R. Speidel
By: Marks & Clerk
        Attys.

Patented Nov. 1, 1932

1,886,061

UNITED STATES PATENT OFFICE

ROBERT SPEIDEL, OF PFORZHEIM, GERMANY

APPARATUS FOR PEELING POTATOES

Application filed December 17, 1929, Serial No. 414,762, and in Germany May 2, 1928.

The present invention relates to apparatus for peeling potatoes, fruit and the like. The peeling is difficult, in as much as on the one hand the peeling operation is to be as complete as possible and on the other hand the abraded matter is to be as little as possible. Furthermore the largest possible quantities are to be peeled at once, and at the same time contact of the peel removed, which may be dirty, with the peeled potato or the like should as far as possible be avoided. It is therefore necessary that the peelings should be completely and continuously removed and should be separated from the peeled articles during the peeling process. These requirements, which have to be fulfilled by a satisfactory peeling machine, have hitherto only been fulfilled separately by the various known peeling machines. There has hitherto been no peeling machine that simultaneously fulfills all these requirements. The present machine provides a solution for all these problems at the same time.

According to the present invention all these advantages are simultaneously obtained owing to the fact that the peeled material in a receptacle filled with water, with an internal peeling wall, is raised by revolving stirring vanes, thrown against the rubbing surfaces, and guided along these rubbing surfaces until the said material is guided by deflection towards the centre of the vessel again. The rubbing surfaces are arranged at some distance from the vessel wall, so that the portions rubbed off, particularly the dirt, can immediately enter the annular space between the perforated rubbing wall and the wall of the vessel. From here the parings and the dirt are discharged through an overflow pipe which opens at the bottom of the vessel. In this manner the pared material, even if it is heavier than water, is kept suspended in the water by continually stirring round, so that any deposition of the peeled material is prevented. This is necessary in order to prevent the disintegration of the bottom layer of peeled potatoes or fruit. In this manner not only the dirt but also the outermost skin is very finely rubbed off, so that the paring loss per cent is very small. It is furthermore particularly advantageous that the vitamins lying close beneath the skin are retained to an increased extent.

Apparatus for carrying out this process is illustrated in the accompanying drawings, in which Figure 1 shows the receptacle of the peeling machine in sectional elevation with the stirring vane, Figure 2 shows a plan thereof, Figure 3 shows the stirring vane seen from below, Figure 4 is a section through the right-hand vane on the line IV—IV in Figure 1, Figure 5 is a section on the line V—V in Fig. 1, and Figure 6 shows a detail of the rubbing wall, in sectional plan.

In these drawings, $a$ denotes the receptacle of the peeling machine, which is provided at the bottom with an adjustable overflow pipe $b$. At the bottom of the overflow vessel is arranged an insertion bottom $f$. In the interior of the vessel, at some distance from the side wall, is arranged a rubbing surface insertion $h$. This friction rubbing surface $h$ is preferably provided with a deflecting surface $h'$, by which the potatoes or fruit under treatment are guided away from the outer periphery towards the centre. This rubbing insertion $h$ is preferably so arranged as to be removable by means of eyes, in order to facilitate the cleaning of the machine. Similarly also the bottom $f$ can be taken out, for the complete emptying of the receptacle, preferably in conjunction with the stirring vane. In the centre the bottom of the vessel carries a rotatable journal $c$, which is rotated by means of a worm and worm gear $d$. Upon this journal $c$ is mounted the actual stirring vane $e$. This stirring vane is so arranged that the material $x$ under treatment, which rests upon the bottom, is raised in the direction of the arrow $y$ and thrust outwards. For this purpose the stirring vane $e$ is provided with vane surfaces $k$, which are curved in a radial direction with their convexity in the direction of rotation and provided at their lower ends with run-up surfaces $z$, directed forwards in the direction of rotation and bent back in front of the convexities of the vanes. The stirring vane e is preferably connected with the bottom plate f, in such a way that the stirring vane can rotate relatively to the bottom plate but that the bottom plate can be taken out, together with the stirring vane e, this arrangement not being shown in the drawings.

The peeling casing h, h' suspended in the vessel a preferably has a cross section as shown in Figure 4. The peeling casing comprises inwardly bent elements, which at their tips release holes for the penetration of the rubbings and dirt, so that the rubbings can immediately enter the annular space betweeen the peeling case h and the receptacle a.

The method of operation is as follows:—

The peeling bottom f is first put in, together with the stirring vane if the latter is connected with it. The peeling casing h is then inserted, the receptacle filled with water, and the potatoes, fruit or the like to be peeled are now introduced. The stirring vane is hereupon set in motion. Owing to the shape of the stirring vane, the material to be treated is first guided over the rubbing bottom f, and at the same time the material is driven up at the front edges z and outwards against the peeling casing, so that the material remains suspended in the water until it arrives at the deflecting surface h' and falls to the bottom towards the centre, after which it traverses the same path again. The particles of dirt pass through the apertures in the bottom f and in the peeling wall h, sink to the bottom, and, being continuously carried along by water, pass out of the receptacle through the overflow pipe b. By the stirring vane the result is obtained that the greater part of the peeled material is kept suspended in the water bath without settling upon the bottom in a deep layer.

What I claim is:—

A machine for peeling potatoes or the like comprising a container for receiving a volume of water, an overflow pipe carried by the container, a stationary abrading casing in the container and spaced from the wall thereof, stationary deflecting members secured to the abrading casing, an abrading bottom for the casing mounted therein, a rotary double vane having cam surfaces adapted to deliver the potatoes continuously from the center of the bottom of the container and upwardly and outwardly therein.

In testimony whereof I have signed my name to this specification.

ROBERT SPEIDEL.